United States Patent
Liles

(10) Patent No.: US 10,150,842 B2
(45) Date of Patent: Dec. 11, 2018

(54) METHOD OF PREPARING CONDENSATION CROSS-LINKED PARTICLES

(71) Applicant: Dow Corning Corporation, Midland, MI (US)

(72) Inventor: Donald Taylor Liles, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 15/534,289

(22) PCT Filed: Dec. 18, 2015

(86) PCT No.: PCT/US2015/066721
§ 371 (c)(1),
(2) Date: Jun. 8, 2017

(87) PCT Pub. No.: WO2016/100840
PCT Pub. Date: Jun. 23, 2016

(65) Prior Publication Data
US 2017/0362389 A1 Dec. 21, 2017

Related U.S. Application Data

(60) Provisional application No. 62/094,683, filed on Dec. 19, 2014.

(51) Int. Cl.
| | |
|---|---|
| *C08G 77/20* | (2006.01) |
| *C08G 77/38* | (2006.01) |
| *C08L 83/04* | (2006.01) |
| *C08G 77/12* | (2006.01) |
| *C08G 77/08* | (2006.01) |
| *C08J 5/18* | (2006.01) |
| *C08L 83/06* | (2006.01) |
| *C08K 5/56* | (2006.01) |
| *C08L 83/00* | (2006.01) |

(52) U.S. Cl.
CPC ............. *C08G 77/38* (2013.01); *C08G 77/08* (2013.01); *C08G 77/12* (2013.01); *C08G 77/20* (2013.01); *C08J 5/18* (2013.01); *C08K 5/56* (2013.01); *C08L 83/00* (2013.01); *C08L 83/04* (2013.01); *C08L 83/06* (2013.01); *C08J 2383/06* (2013.01); *C08L 2201/52* (2013.01)

(58) Field of Classification Search
None
See application file for complete search history.

(56) References Cited

U.S. PATENT DOCUMENTS

| | | | | |
|---|---|---|---|---|
| 4,652,624 A | * | 3/1987 | Allen ................. | C08L 83/04 528/17 |
| 4,898,910 A | * | 2/1990 | Kamis .................. | C08L 83/14 524/425 |
| 4,956,435 A | * | 9/1990 | Chu .................... | C08K 5/33 524/860 |
| 4,962,165 A | * | 10/1990 | Bortnick ............. | C08F 283/128 525/479 |
| 5,051,455 A | * | 9/1991 | Chu .................... | C08K 9/04 523/212 |
| 5,053,442 A | * | 10/1991 | Chu .................... | C08K 9/04 523/212 |
| 5,403,881 A | * | 4/1995 | Okawa ................. | C07F 7/0859 524/261 |
| 6,281,279 B1 | * | 8/2001 | Davis .................. | C08J 3/16 524/501 |
| 7,005,460 B2 | | 2/2006 | Bublewitz et al. | |
| 7,276,556 B2 | | 10/2007 | Morita et al. | |
| 8,278,367 B2 | | 10/2012 | Boettcher et al. | |
| 8,925,626 B2 | | 1/2015 | Akinaga et al. | |
| 2002/0010245 A1 | * | 1/2002 | Enami ................. | C08K 9/06 524/430 |
| 2002/0068223 A1 | * | 6/2002 | Cetin ................. | C08G 59/3254 430/1 |
| 2002/0147275 A1 | | 10/2002 | Bublewitz et al. | |
| 2002/0156186 A1 | | 10/2002 | Bublewitz et al. | |
| 2003/0120016 A1 | * | 6/2003 | Okawa ................. | C07F 7/0859 528/10 |
| 2004/0105071 A1 | * | 6/2004 | Liao ................... | A61L 27/18 351/159.01 |
| 2004/0171699 A1 | | 9/2004 | Morita et al. | |
| 2005/0112072 A1 | | 5/2005 | Wang | |
| 2005/0239958 A1 | | 10/2005 | Bublewitz et al. | |
| 2008/0200584 A1 | | 8/2008 | Bottcher et al. | |
| 2010/0069526 A1 | | 3/2010 | Henrik Bottcher et al. | |
| 2011/0177342 A1 | | 7/2011 | Itoh et al. | |
| 2013/0340992 A1 | | 12/2013 | Akinaga et al. | |

* cited by examiner

OTHER PUBLICATIONS

PCT/US2015/066721 International Search Report dated Apr. 7, 2016, 4 pages.

*Primary Examiner* — Robert S Loewe

(74) *Attorney, Agent, or Firm* — Warner Norcross & Judd LLP

(57) ABSTRACT

A method of preparing condensation cross-linked particles in an emulsion includes combining a first linear reactant having two unsaturated carbon-carbon moieties, a second linear reactant having two Si—H moieties, and a third reactant having at least one condensable reactive group and having up to two unsaturated carbon-carbon moieties or Si—H moieties with the proviso that the third reactant has at least one unsaturated carbon-carbon moiety or Si—H moiety. The first, second, and third reactants are combined in the presence of a hydrosilylation catalyst and a polar liquid to form an emulsion wherein the first, second, and third reactants react via a hydrosilylation reaction to form particles that have a linear backbone wherein the condensable reactive group is disposed thereon. The method also includes cross-linking the linear backbone via a condensation reaction to form the condensation cross-linked particles.

17 Claims, 1 Drawing Sheet

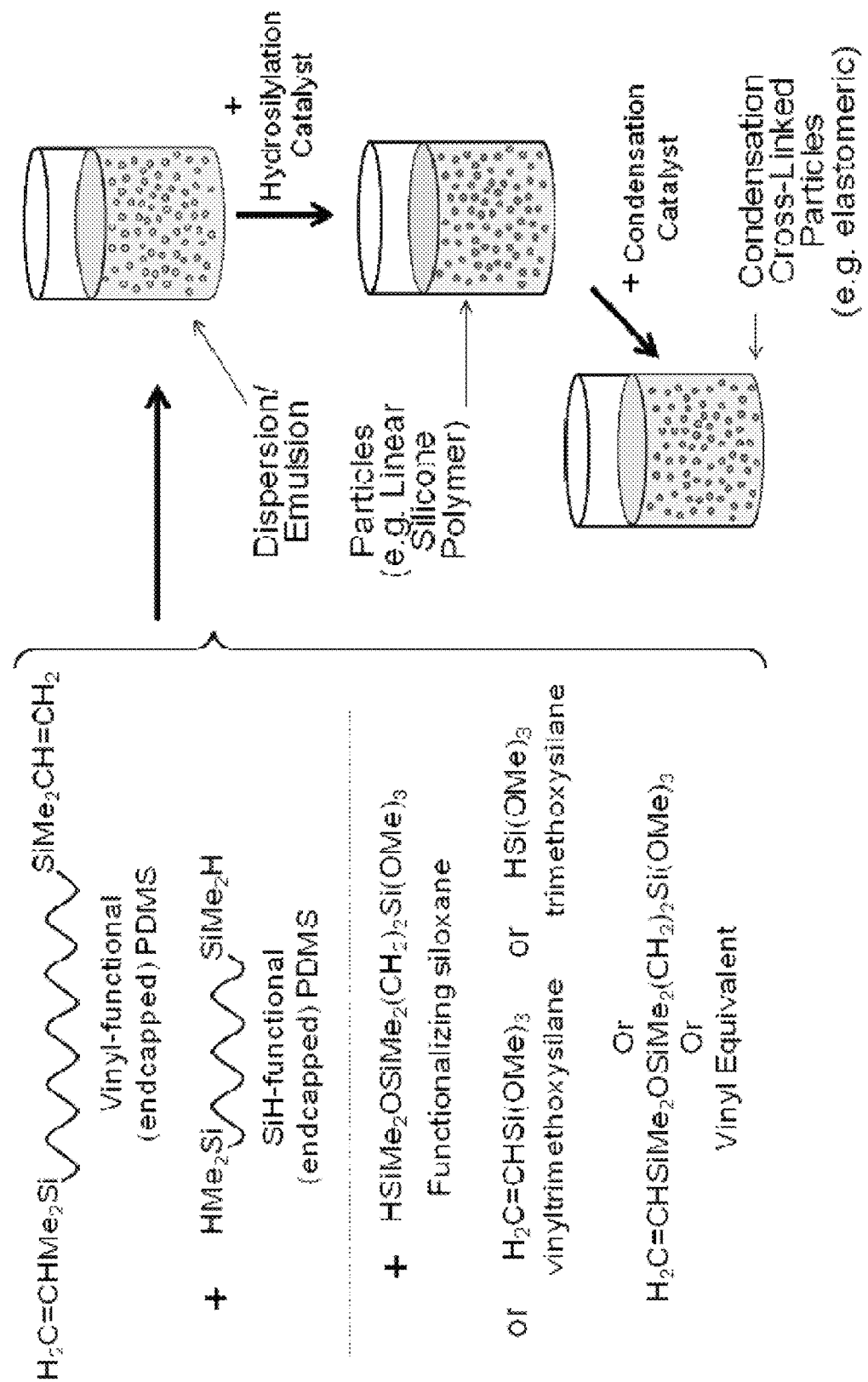

METHOD OF PREPARING CONDENSATION CROSS-LINKED PARTICLES

CROSS REFERENCE TO RELATED APPLICATIONS

This application is the National Stage of International Application No. PCT/US2015/066721 filed on Dec. 18, 2015, which claims priority to and all advantages of U.S. Provisional Patent Application No. 62/094,683 filed on Dec. 19, 2014, the contents of which are incorporated herein by reference.

FIELD OF THE DISCLOSURE

The present disclosure generally relates to a method of preparing condensation cross-linked particles. More specifically, the method utilizes an emulsion and a condensation reaction to cross link particles that have a linear backbone.

BACKGROUND OF THE DISCLOSURE

It is well known that it is difficult to form very high molecular weight polymers and then disperse those polymers into emulsions. Typically, such polymers (such as silicone elastomers or rubbers) are not soluble in many solvents and simply swell, but do not dissolve. For those reasons, working with such polymers in solutions or emulsions is very difficult.

Aqueous emulsions of cross-linkable siloxane emulsions are also well known and they can be used in a variety of applications most notably as film formers upon the removal of water. High molecular weight polymers are most desirable in these applications as they typically form films with improved properties over films formed from lower molecular weight polymers. However, it can be difficult to obtain satisfactory aqueous emulsions of high molecular weight polymers that can be crosslinked to form films upon removal of water. Typically high molecular weight polymers are difficult to emulsify due to their high viscosity and if they can be emulsified, somewhat poor quality emulsions having rather large particle sizes result. Accordingly, there remains an opportunity for improvement.

BRIEF DESCRIPTION OF THE FIGURE

Other advantages of the present disclosure will be readily appreciated, as the same becomes better understood by reference to the following detailed description when considered in connection with FIG. 1 which sets forth a reaction scheme that illustrates one non-limiting embodiment of the method of this disclosure.

SUMMARY OF THE DISCLOSURE

This disclosure provides a method of preparing condensation cross-linked particles in an emulsion includes combining a first linear reactant having two unsaturated carbon-carbon moieties, a second linear reactant having two Si—H moieties, and a third reactant having at least one condensable reactive group and having up to two unsaturated carbon-carbon moieties or Si—H moieties with the proviso that the third reactant has at least one unsaturated carbon-carbon moiety or Si—H moiety. The first, second, and third reactants are combined in the presence of a hydrosilylation catalyst and a polar liquid to form an emulsion wherein the first, second, and third reactants react via a hydrosilylation reaction to form particles that have a linear backbone wherein the condensable reactive group is disposed thereon. The method also includes cross-linking the linear backbone via a condensation reaction to form the condensation cross-linked particles.

DETAILED DESCRIPTION OF THE DISCLOSURE

This disclosure provides a method of preparing condensation cross-linked particles in an emulsion, a dispersion that includes a polar continuous phase and the condensation cross-linked particles dispersed in the polar continuous phase, and the condensation cross-linked particles themselves. Each is described in greater detail below.

Method of Preparing the Condensation Cross-Linked Particles:

Providing a First Linear Reactant:

The method of preparing the condensation cross-linked particles (hereinafter described as the "method") includes the step of providing a first linear reactant having two unsaturated carbon-carbon moieties. The step of providing is not particularly limited and may be alternatively described as supplying, purchasing, delivering, making available, etc. The first linear reactant is typically provided to a reactor or other reaction vessel, as is described in greater detail below.

The first linear reactant having the two unsaturated carbon-carbon moieties is also not particularly limited and may be organic or inorganic. In various non-limiting embodiments, the first linear reactant does not have a pendant (i.e., non-terminal) unsaturated carbon-carbon moiety. In other embodiments, the first linear reactant has one or two pendant unsaturated carbon-carbon moieties. The first linear reactant has exactly two unsaturated carbon-carbon moieties, i.e., does not have zero or one or have three or more unsaturated carbon-carbon moieties.

The first linear reactant may be organic (e.g. and free of silicon atoms), may be a silane or siloxane or combinations thereof, or may be inorganic and still include the two unsaturated carbon-carbon moieties. The terminology "linear" is as understood by those of skill in the art.

A combination of compounds may also be utilized wherein one or more compounds of the combination each independently include a single terminal unsaturated carbon-carbon moiety and one or more other compounds of the combination each independently include two unsaturated carbon-carbon moieties.

The unsaturated carbon-carbon moieties may independently be an alkynyl moiety (i.e., a carbon-carbon triple bond; C≡C) or an alkenyl moiety (i.e., a carbon-carbon double bond; C=C). For example, the first linear reactant may include an alkynyl moiety and an alkenyl moiety simultaneously. Alternatively, the first linear reactant may include two alkenyl moieties and no alkynyl moieties. Even further, the first linear reactant may include two alkynyl moieties and no alkenyl moieties.

In one embodiment, the first linear reactant is organic. In another embodiment, the first linear reactant is chosen from alkenes having 3, 4, 5, 6, 7, 8, 9, 10, 11, or 12, carbon atoms. In various embodiments, the first linear reactant is hexadiene or octadiene or a combination thereof.

Alternatively, the first linear reactant may be a silane or siloxane. In another embodiment, the first linear reactant is a siloxane having two (optionally terminal) organic groups such as vinyl or allyl groups. In still another embodiment, the first linear reactant is $H_2C=CHSiR_2[OSiR_2]_n OSiR_2CH=CH_2$, wherein each R is independently an alkyl or aryl group having 1, 2, 3, 4, 5, 6, 7, 8, 9, 10, 11, or 12, carbon atoms, and n is a number from 0 to 10,000, e.g. from 15 to 20. In additional embodiments, any value, or range of values, both whole and fractional, within or between any one or more values described above are contemplated.

The first linear reactant is typically provided in an amount of from 0.1 to 99.9, from 0.1 to 10, from 10 to 99.9, or from greater than 10 to an amount of 99.9, parts by weight per 100 parts by weight of the particles. If the first linear reactant is a combination of compounds, then a total weight of the combination is typically present in an amount as immediately described above. In additional embodiments, any value, or range of values, both whole and fractional, within or between any one or more values described above are contemplated.

Providing a Second Linear Reactant:

The method also includes the step of providing a second linear reactant having two Si—H moieties. The terminology "linear" is as understood by those of skill in the art. The step of providing may be as described above or may be different. The second linear reactant may be organic such that the only silicon atoms present in the second linear reactant are of the Si—H moieties. Alternatively, the second linear reactant may include more than one silicon atom which may or may not be part of the Si—H moieties. Alternatively, the second linear reactant may be a silane, siloxane, or combination thereof.

The second linear reactant has exactly two unsaturated Si—H moieties, i.e., does not have zero or one or have three or more Si—H moieties. A combination of compounds may also be utilized wherein one or more compounds of the combination each independently include a single Si—H moiety and one or more other compounds of the combination each independently include two Si—H moieties. In one non-limiting embodiment, the second linear reactant does not have a pendant Si—H moiety. In another embodiment, the second linear reactant has one or two pendant Si—H moieties.

In various embodiments, the second linear reactant is a methylhydrogen/dimethyl polysiloxane (fluid). In other embodiments, the second linear reactant is HR$_2$Si[OSiR$_2$]$_n$OSiR$_2$H, wherein each R is independently an alkyl or aryl group having 1, 2, 3, 4, 5, 6, 7, 8, 9, 10, 11, or 12, carbon atoms, and n is a number from 0 to 10,000, e.g. from 15 to 20. In other embodiments the second linear reactant may be an oligomeric siloxane. In additional embodiments, any value, or range of values, both whole and fractional, within or between any one or more values described above are contemplated.

In one embodiment, the first linear reactant is an organopolysiloxane or organic compound (free of silicon atoms) having two terminal alkenyl groups and the second linear reactant is an organopolysiloxane that has two terminal silicon-bonded hydrogen atoms or an organic compound that has two terminal silicon-bonded hydrogen atoms (but is free from other silicon atoms).

The second linear reactant is typically provided in an amount of from 0.1 to 99.9, from 0.1 to 10, from 10 to 99.9, or from greater than 10 to an amount of 99.9, parts by weight per 100 parts by weight of the particles. In additional embodiments, any value, or range of values, both whole and fractional, within or between any one or more values described above are contemplated.

Providing a Third Reactant:

The method also includes the step of providing a third reactant having at least one condensable reactive group and having up to two unsaturated carbon-carbon moieties or Si—H moieties with the proviso that the third reactant has at least one unsaturated carbon-carbon moiety or Si—H moiety. In other words, the third reactant can have a total of up to two total (unsaturated carbon-carbon moieties+Si—H moieties). For example, the third reactant can have one unsaturated carbon-carbon moiety and no Si—H moiety. The third reactant can have one Si—H moiety and no unsaturated carbon-carbon moiety. The third reactant can have two unsaturated carbon-carbon moieties and no Si—H moieties. The third reactant can have two Si—H moieties and no unsaturated carbon-carbon moieties. Alternatively, the third reactant can have one unsaturated carbon-carbon moiety and one Si—H moiety. The step of providing may be as described above or may be different.

The third reactant is also not particularly limited and can act as a chain stopper. If acting as a chain stopper, the then third reactant does not include more than one unsaturated carbon-carbon moiety or Si—H moiety. Also in such embodiments, the single unsaturated carbon-carbon moiety or Si—H moiety may be terminal or pendant.

The third reactant may be organic and be free of silicon atoms. Alternatively, the third reactant may be organic and may only include a silicon atom of the optional Si—H moiety. Still further, the third reactant may be organic and include more than one silicon atom. In one embodiment, the third reactant is an alkoxysilane having an Si—H moiety. In another embodiment, the third reactant is an alkoxysilane having an unsaturated carbon-carbon moiety.

The unsaturated carbon-carbon moieties or the Si—H moieties of the third reactant may be any of those as described above relative to the first linear reactant. However, the unsaturated carbon-carbon moieties or the Si—H moieties of the third reactant may be the same or may be different from those described above of the first and second linear reactants.

The condensable reactive group of the third reactant is not particularly limited except that this group is capable of participating in a condensation reaction, as appreciated in the art. For example, the condensable reactive group (or leaving group) may be an alkoxy group, an oxime group, a carboxy group, an acetoxy group, an alkyleneoxy group, an amine group, an aminoxy group, or an amide group. Alternatively, the condensable reactive group may be any group appreciated by those of skill in the art as an acceptable leaving group on silicon that can function in a condensation reaction.

In one embodiment, the third reactant has the formula:

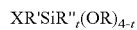

wherein each of R, R', R" is independently an organic radical having 1-12 carbon atoms, X is independently the unsaturated carbon-carbon moiety or the Si—H moiety, and t is 0-2. Each of R, R' and R" can independently be an organic radical each having 1, 2, 3, 4, 5, 6, 7, 8, 9, 10, 11, or 12 carbon atoms.

Moreover, the third reactant can include two or more compounds wherein each is defined by the aforementioned formula. In other embodiments, the third reactant is HSi(CH$_3$)$_2$OSi(CH$_3$)$_2$CH$_2$CH$_2$Si(OCH$_3$)$_3$ or H$_2$C=CHSi(OCH$_3$)$_3$ or a combination thereof. In other embodiments, the third reactant can be or include HSi(OC$_2$H$_5$)$_3$; HSiCH$_3$(OCH$_3$)$_2$; HSi(CH$_3$)$_2$OCH$_3$; H$_2$C=CHSiCH$_3$(OCH$_3$)$_2$; H$_2$C=CHSi(CH$_3$)$_2$OCH$_3$; H$_2$C=CHCH$_2$Si(OCH$_3$)$_3$; H$_2$C=CHCH$_2$SiCH$_3$(OCH$_3$)$_2$; or H$_2$C=CHCH$_2$Si(CH$_3$)$_2$OCH$_3$; or combinations thereof.

In still another embodiment, the condensable reactive group of the third reactant is further defined as an alkoxy group. Alternatively, the condensable reactive group may be an —Si(OR) group wherein R is an organic radical having 1-12 carbon atoms, i.e., 1, 2, 3, 4, 5, 6, 7, 8, 9, 10, 11, or 12, carbon atoms or any range of values thereof.

A combination of compounds may also be utilized wherein one or more compounds of the combination each independently include one unsaturated carbon-carbon moiety or one Si—H moiety and the others include up to two total of such moieties.

The third reactant is typically provided in an amount of from 0.1 to 99.9, from 0.1 to 10, from 10 to 99.9, or from greater than 10 to an amount of 99.9, parts by weight per 100 parts by weight of the particles. If the third reactant is a combination of compounds, then a total weight of the combination is typically present in an amount as immediately described above. In additional embodiments, any value, or range of values, both whole and fractional, within or between any one or more values described above are contemplated.

Providing a Hydrosilylation Catalyst:

The method also includes the step of providing a hydrosilylation catalyst. The step of providing may be the same as described above or may be different. The hydrosilylation catalyst may be any known in the art. In various embodiments, the hydrosilylation catalyst includes platinum, rhodium, iridium, palladium or ruthenium, or combinations thereof. The hydrosilylation catalyst may be, for example, a fine platinum powder, platinum black, chloroplatinic acid, an alcoholic solution of chloroplatinic acid, an olefin complex of chloroplatinic acid, a complex of chloroplatinic acid and alkenylsiloxane, or a thermoplastic resin that includes the aforementioned platinum catalyst. In another embodiment, the hydrosilylation catalyst is platinum vinyl siloxane complex such as Karstedt's catalyst or Speier's catalyst, or combinations thereof. The hydrosilylation catalyst may be a single catalyst or a combination of two or more catalysts. In other words, one, more than one, or at least one, hydrosilylation catalysts may be utilized.

The hydrosilylation catalyst is typically provided in an amount of from 1 to 100, 1 to 10, or 10 to 100, parts per million of platinum calculated as elemental platinum based on total particle weight. In additional embodiments, any value, or range of values, both whole and fractional, within or between any one or more values described above are contemplated.

Providing a Polar Liquid:

The method further includes the step of providing a polar liquid. Typically, the polar liquid is not a "solvent" in that the first, second, and third reactants do not typically "dissolve" in the polar liquid. The polar liquid is not particularly limited but may be described as a hydrophilic liquid, a polar aprotic liquid, or a polar protic liquid. Typically, the terminology "hydrophilic" describes that the polar liquid is polar and/or (a)protic and is water loving, as understood in the art. The polar liquid may be, include, consist essentially of, or consist of water, alcohols, polar protic liquids, polar aprotic liquids, and combinations thereof. Various non-limiting examples of the polar liquid include water, alcohols, tetrahydrofuran (THF), ethyl acetate, acetone, dimethylformamide (DMF), acetonitrile, dimethyl sulfoxide (DMSO), formic acid, n-butanol, isopropanol (IPA), nitromethane, ethanol, methanol, acetic acid, and combinations thereof. In various embodiments, the polar liquid is chosen from methanol, ethanol, glycols, water, and combinations thereof. Alternatively, the polar liquid may be chosen from methanol, ethanol, propanol, butanol, and/or any other alkane based alcohol solvents. In various embodiments, the polar liquid is water or methanol or ethanol or propanol or butanol or a glycol or an alkane based alcohol solvent or a combination of two or more of these. The water is not particularly limited and may be tap water, well water, potable or non-potable water, etc. The water may be purified or non-purified. The terminology "consisting essentially of" typically describes that the continuous phase (or water itself) includes less than 10, 9, 8, 7, 6, 5, 4, 3, 2, 1, 0.5, or 0.1, weight percent of a hydrophobic or non-polar liquid. In various embodiments, one, more than one, or at least one, polar liquid may be utilized.

The polar liquid is typically provided in an amount of from 20 to 80, 25 to 75, 30 to 70, 35 to 65, 40 to 60, 45 to 55, or about 50, parts by weight per 100 parts by weight of the continuous phase, described in greater detail below. In additional embodiments, any value, or range of values, both whole and fractional, within or between any one or more values described above are contemplated.

Combining the First, Second, and Third Reactants:

The method further includes the step of combining the first, second, and third reactants. More typically, this step is further defined as combining the first, second, and third reactants, along with the hydrosilylation catalyst and the polar liquid. As first introduced above, the first, second, and third reactants are typically provided or introduced into a reactor or other reaction vessel. The first, second, and third reactants are combined in the presence of the hydrosilylation catalyst and the polar liquid to form an emulsion wherein the polar liquid is the continuous phase and the first, second, and third reactants are the dispersed phase. Typically, this emulsion is described as an oil in water emulsion (i.e., an o/w emulsion).

The first, second, and third reactants, along with the hydrosilylation catalyst and the polar liquid, may each be independently combined or introduced into the reaction vessel in a continuous mode or a batch mode. The first, second, and third reactants, along with the hydrosilylation catalyst and the polar liquid, may be combined in any order and in one or more discrete steps. Alternatively, first, second, and third reactants, along with the hydrosilylation catalyst and the polar liquid, may be combined with any one or more of each other simultaneously.

In one embodiment, the step of combining the first, second, and third reactants further includes phase inverting the combination of the first, second, and third reactants (e.g. in the presence of the hydrosilylation catalyst and polar liquid) to form the emulsion. However, the step of forming the emulsion is not limited and may also or alternatively include applying shear, mixing, vortexing, and/or any other method known in the art.

The method may also include the steps of providing a surfactant and/or combining the surfactant with one or more of the first, second or third reactants, with the hydrosilylation catalyst, with the polar solvent, and/or with any one or more of these, either sequentially or simultaneously. The surfactant may be chosen from non-ionic surfactants, cationic surfactants, anionic surfactants, amphoteric surfactants, and combinations thereof. Suitable non-ionic surfactants include, but are not limited to, Guerbet alcohol alkoxylates (or derivatives thereof), alkylphenol alkoxylates, ethoxylated and propoxylated fatty alcohols, alkyl polyglucosides and hydroxyalkyl polyglucosides, sorbitan derivatives, N-alkylglucamides, alkylene oxide block copolymers such as block copolymers of ethylene oxide, propylene oxide and/or butylene oxide, polyhydroxy and polyalkoxy fatty acid derivatives, amine oxides, silicone polyethers, various polymeric surfactants based on polysaccharides, polymeric surfactants based on polyvinyl alcohol and polyacrylamide, and combinations thereof.

Suitable cationic surfactants include, but are not limited to, interface-active compounds including ammonium groups such as alkyldimethylammonium halides and compounds having the chemical formula RR'R"R"'N+X— wherein R, R', R", and R"' are independently selected from the group of alkyl groups, aryl groups, alkylalkoxy groups, arylalkoxy groups, hydroxyalkyl(alkoxy) groups, and hydroxyaryl(alkoxy) groups and wherein X is an anion.

Suitable anionic surfactants include, but are not limited to, fatty alcohol sulfates and sulfates of ethoxylated fatty alcohols. Further non-limiting examples of suitable anionic surfactants include alkanesulfonates, linear alkylbenzenesulfonates, linear alkyltoluenesulfonates, diphenyl sulfonates, and diphenylether sulfonates. Still further, the anionic surfactant may include olefinsulfonates and disulfonates, mixtures of alkene- and hydroxyalkane-sulfonates or di-sulfonates, alkyl ester sulfonates, sulfonated polycarboxylic acids, alkyl glyceryl sulfonates, fatty acid glycerol ester sulfonates, alkylphenol polyglycol ether sulfates, paraffinsulfonates, alkyl phosphates, acyl isothionates, acyl taurates, acyl methyl taurates, alkylsuccinic acids, alkenylsuccinic acids and corresponding esters and amides thereof, alkylsulfosuccinic acids and corresponding amides, mono- and di-esters of sulfosuccinic acids, acyl sarcosinates, sulfated alkyl polyglucosides, alkyl polyglycol carboxylates, hydroxyalkyl sarcosinates, and combinations thereof. Still further, polymeric anionic surfactants based on acrylic acid or sulfonated polystyrene, and combinations thereof, may also be used. Suitable ampholytic surfactants include, but are not limited to, aliphatic derivatives of secondary and/or tertiary amines which include an anionic group, betaine derivatives, and combinations thereof.

Additionally, the surfactant may independently include or be aliphatic and/or aromatic alkoxylated alcohols, LAS (linear alkyl benzene sulfonates), paraffin sulfonates, FAS (fatty alcohol sulfates), FAES (fatty alcohol ethersulfates), alkylene glycols, trimethylolpropane ethoxylates, glycerol ethoxylates, pentaerythritol ethoxylates, alkoxylates of bisphenol A, and alkoxylates of 4-methylhexanol and 5-methyl-2-propylheptanol, and combinations thereof. Further, the surfactant may include or be alkylpolysaccharides including linear or branched alkyl groups, linear or branched alkenyl groups, alkylphenyl groups, alkylene groups, and/or combinations thereof.

The one or more surfactants may be used in amounts of from 0.01 to 20, 1 to 15, 1 to 10, 1 to 5, 5 to 20, 5 to 15, 5 to 10, 10 to 20, 10 to 15, 0.01 to 5, 0.05 to 5, 0.1 to 5, 0.1 to 4, 0.1 to 3, 0.1 to 2, 0.1 to 1, 0.5 to 5, 0.5 to 4, 0.5 to 3, 0.5 to 2, 0.5 to 1, 1 to 5, 1 to 4, 1 to 3, 1 to 2, 2 to 5, 2 to 4, 2 to 3, 3 to 5, 3 to 4, or 4 to 5, weight percent based on a total weight of the first, second, and third reactants (e.g. the weight of the dispersed phase) Moreover, the silicone particles may include one or more additives including, but not limited to preservatives, biocides, thickeners, freeze/thaw additives, rust inhibitors, pigments, and other additives known in the art.

Upon combination to form the emulsion and in the presence of the hydrosilylation catalyst, the first, second, and third reactants may react at ambient temperature or may fail to react at ambient temperature. The method may include the step of heating the emulsion. For example, the emulsion may require heating to promote the hydrosilylation reaction or to speed up the hydrosilylation reaction. Alternatively, no heating may be required or desired. For example, the emulsion and/or one or more of the first, second, and third reactants or the polar liquid may be heated to temperatures from room temperature (approximately 25° C.) to 250° C., alternatively from room temperature to 150° C., alternatively from room temperature to 115° C., at atmospheric pressure. The reactants may be heated for a length of time sufficient to cure (cross-link) the reactants, e.g. from 0.1 to 3 hrs. In additional embodiments, any value, or range of values, both whole and fractional, within or between any one or more values described above are contemplated.

Typically, the hydrosilylation reaction proceeds between the two unsaturated carbon-carbon moieties of the first linear reactant and the two Si—H moieties of the second linear reactant, as is generally understood in the art. This reaction forms polymers having a linear chain or backbone. Accordingly, it can be said that the particles, at this point, have a linear backbone, i.e., the particles are composed of polymers and the polymers themselves have the linear backbone. The linear backbone may be further described as a linear silicone backbone or a linear organic (i.e., non-silicone) backbone.

The third reactant typically acts as a chain stopper to stop the growing chain formed from the aforementioned hydrosilylation reactant. Any one or more of these reactions may occur simultaneously or sequentially. The condensable reactive group of the third reactant is typically not involved in the aforementioned hydrosilylation reactions of the first, second, and third reactants.

Upon the hydrosilylation reaction of the first, second, and third reactants, particles are formed. In other words, the first, second, and third reactants react in the presence of the hydrosilylation catalyst and in the emulsion to form the particles via one or more hydrosilylation reactions to form the particles in the emulsion. Alternatively, the particles may be present in a slurry.

In various embodiments, the particles are typically further defined as silicone or polyorganosiloxane particles. Typically, if the first, second, and/or third reactants include silicon-oxygen or siloxane bonds, the particles may be described as silicone or polyorganosiloxane particles.

However, the particles could be alternatively described as organic particles that include a particular weight or molar percent of silicon. Typically, if the first, second, and third reactants include very little weight or molar percent of silicon, the particles will be mostly organic. However, it is to be appreciated that the particles must include some weight or molar percent of silicon because the second linear reactant must include the two Si—H moieties. In other words, the particles are not entirely organic and free of silicon because at least some silicon atoms are present due to the Si—H moieties of the second linear reactant.

At this stage, the particles can be alternatively described as the hydrosilylation reaction product of the first, second, and third reactants. This hydrosilylation reaction product can be further described as having a viscosity of from 1 to 500,000, from 1 to 100,000, from 1 to 10,000, from 1 to 1,000, from 1 to 100, from 100 to 500,000, from 100 to 100,000, from 100 to 10,000, from 100 to 1,000, from 1,000 to 500,000, from 1,000 to 100,000, from 1,000 to 10,000, etc. Pa-sec measured at 25° C. using an oscillary rheometer (using parallel plates) such as an Ares. In additional embodiments, any value, or range of values, both whole and fractional, within or between any one or more values described above are contemplated.

The particles (or, e.g. the polymers that make up the particles) formed in the aforementioned reactions have the condensable reactive group disposed thereon and are disposed in the polar liquid. Said differently, the polymers that make up the particles have the condensable reactive group disposed thereon. If the particles are solid particles, then upon formation of the particles in the polar liquid, the aforementioned emulsion may be more accurately described as a dispersion wherein the polar liquid is the continuous phase and the (solid) particles are the dispersed phase that is dispersed in the continuous phase. However, if the particles are not solid (e.g. are a gel or liquid) then the aforementioned emulsion may continue to be accurately described as an emulsion wherein the polar liquid is the continuous phase and the (non-solid, e.g. gel or liquid) particles are the dispersed phase that is dispersed in the continuous phase.

Alternatively, the particles formed in this stage of the method may be described as (silicone or organic polymeric) particles that include Si-Alkoxy groups chemically bonded to a polymer network of the particles. However, the aforementioned particles that are formed at this stage of the method are not the final particles, and are not elastomeric at this stage, because the particles formed at this stage of the method are not cross-linked via condensation. In other embodiments, the particles formed from this step of the method may be described as having —Si(OR)$_n$ groups wherein R may be as described herein or be any organic moiety and n is a number of from 1 to 3, i.e., 1, 2, or 3. These groups may be described as being covalently bonded to a polymeric network formed upon reaction of the first, second, and third reactants.

Removing the Polar Liquid:

The method may optionally include the step of removing the polar liquid from the particles or separating the polar liquid from the particles. The method may include the step of drying or desiccating the particles. Alternatively, the method may not include the step of removing or separating the polar liquid from the particles.

In one embodiment, the polar liquid is water and the method includes the step of removing the water from the particles and drying the particles. In another embodiment, the polar liquid is methanol and/or ethanol and the method includes the step of removing the methanol and/or ethanol from the particles and drying the particles. In still another embodiment, the polar liquid is methanol and/or ethanol (each of which may be combined with water) and the method does not include the step of removing the methanol and/or ethanol. In an alternative embodiment, the polar liquid may be water and the method does not include the step of removing the water. In other words, the particles may be allowed to remain in the polar liquid or may be removed therefrom.

It is also contemplated that a portion of the polar liquid may be removed and a portion of the polar liquid may be allowed to remain. For example, if the polar liquid is removed, it may be removed in any amount. For example, an entirety of the polar liquid may be removed or any portion less than the entirety of the polar liquid may be removed. The polar liquid may be removed by any mechanism known in the art. For example, the polar liquid may be removed by vacuum and/or filtration (e.g. vacuum filtration), evaporation, desiccation, heating in an oven, and the like.

Cross-Linking the Linear Backbone Via a Condensation Reaction:

The method also includes the step of cross-linking the linear backbone (of the polymers/particles) via a condensation reaction to form the condensation cross-linked particles. The method may also include the step of adding a condensation catalyst to the first, second, and/or third reactants and/or to the particles in the emulsion to cross-link the linear silicone backbone via a condensation reaction of the condensable groups to form the condensation cross-linked particles. This cross-linking reaction can proceed by any known condensation reaction mechanism. The condensation catalyst and the hydrosilylation catalyst may be added together or one before the other. For example, the condensation catalyst and the hydrosilylation catalyst may be combined and/or added to the first, second, and/or third reactants prior to hydrosilylation. In one embodiment, the condensation catalyst is present during hydrosilylation (though inactive) and later catalyzes the condensation reaction. In another embodiment, the condensation catalyst is added after the hydrosilylation reaction has occurred (e.g. and is absent during the hydrosilylation reaction itself).

Similarly, the condensation catalyst is not particularly limited and may be any known in the art. In various embodiments, the condensation catalyst is dibutyltin dilaurate, dibutyltin diacetate, dimethyltin dineodecanoate, stannous octoate, stannous oleate, stannous neodecanoate, dioctyltindilaurate, stannous bis-2-ethylhexanoate, iron octoate, zinc octoate, and the like, and combinations thereof. Alternatively, guanidines such as tetramethylguanidine, and amine salts of carboxylic acids such as triethylammonium acetate, can also be used. The amount of the condensation catalyst utilized herein is also not particularly limited. In various embodiments, the condensation catalyst is utilized in amounts of from 0.1 to 10, 0.1 to 1, 1 to 10, 0.1, 0.2, 0.3, 0.4, 0.5, 0.6, 0.7, 0.8, 0.9, 1, 2, 3, 4, 5, 6, 7, 8, 9, or 10, parts by weight per 100 parts by weight of the particles. In additional embodiments, any value, or range of values, both whole and fractional, within or between any one or more values described above are contemplated.

In one embodiment, the condensation catalyst is diluted in a diluent. In a related embodiment, the step of adding the condensation catalyst is further defined as combining the particles with the condensation catalyst diluted in the diluent. The diluent is not particularly limited and may be chosen from methanol, ethanol, hydrocarbons, silicones, glycols, water, and combinations thereof.

Relative to the condensation reaction, a condensation catalyst may be used or may be omitted. For example, a condensation catalyst may be used along with heat or without heating. Further, heat alone may be used to effect a condensation reaction without a condensation catalyst. In another embodiment, the condensation catalyst is formed into an emulsion with water and the emulsion is added to the particles. Moreover, the condensation reaction may occur in the emulsion or apart from the emulsion. For example, the polar liquid may be separated from the particles such that the particles are no longer in an emulsion. At that point, the condensation reaction may occur, e.g. with or without a condensation catalyst and with or without heat.

After condensation, the cross-linked particles can be further described as elastomeric such that they are insoluble, but swellable, in a solvent. For example, removal of water or the polar liquid may result in isolation of the elastomeric particles.

Additional Embodiments:

This disclosure also provides a method of preparing the particles wherein the method includes the aforementioned steps of providing the first linear reactant, providing the second linear reactant, providing the third reactant, providing the hydrosilylation catalyst, and providing the polar liquid. However, in this embodiment, the method includes a means for forming the particles. For example, the means for forming the particles may be any one or more steps described above, in whole or in part, and in any combination.

Cross-Linked Particles:

The cross-linked particles themselves ultimately formed using the method of this disclosure may be alternatively described as a plurality of particles. The cross-linked particles may be a solid, liquid, or elastomer, e.g. silicone rubber which is known in the art as an elastomeric compound that has both solid and liquid properties. The cross-linked particles may be described as elastomeric. For example, the cross-linked particles may be further defined as silicone rubber that is not dissolvable (or minimally soluble, and potentially swellable, as understood in the art) in an organic solvent. The silicone rubber may also be described as swellable in one or more organic solvents. Alternatively, the cross-linked particles may be described as polyorganosiloxane particles or particles that are, include, consist essentially of, or consist of, one or more polyorganosiloxanes, or one or more silicones, or one or more silicone rubbers, etc. Alternatively, the cross-linked particles may be described as particles that are, include, consist essentially of, or consist of, the aforementioned hydrosilylation reaction product of the first, second, and third reactants. In various embodiments, the terminology "consisting essentially of" describes that the cross-linked particles are free of, or include less than 10, 9, 8, 7, 6, 5, 4, 3, 2, 1, 0.5, 0.1, or 0.05, weight percent of one or more organic polymers and/or non-silicone polymers.

Referring back to the cross-linked particles themselves, the cross-linked particles are not particularly limited in size or shape. Typically, the cross-linked particles are approximately spherical or oval shaped, as understood by those of skill in the art. The cross-linked particles may have an average diameter (or a distribution of average diameters) of from 1 to 500, 1 to 450, 1 to 400, 1 to 350, 1 to 300, 1 to 250, 1 to 200, 1 to 150, 1 to 100, 100 to 500, 150 to 450, 200 to 400, 250 to 350, 300 to 350, 5 to 95, 10 to 90, 15 to 85, 20 to 80, 25 to 75, 30 to 70, 35 to 65, 40 to 60, 45 to 55, 50 to 55, 1 to 20, 2 to 19, 3 to 18, 4 to 17, 5 to 16, 6 to 15, 7 to 14, 8 to 13, 9 to 12, 10 to 11, 1 to 10, 2 to 9, 3 to 8, 4 to 7, 5 to 6, 50 to 70, 55 to 65, or 60 to 65, microns. In other embodiments, the particles have an average diameter or distribution of average diameters from 10 to 100 nm, from 0.1 to 1,000 micrometers, or from 1,000 to 5,000, micrometers. The average diameter of the particles may be determined using a Malvern Mastersizer® S. In additional embodiments, any value, or range of values, both whole and fractional, within or between any one or more values described above are contemplated.

Moreover, the cross-linked particles may include one or more additives including any of those described above. Moreover, reinforcing, non-reinforcing, and semi-reinforcing fillers, e.g. silica, alumina, and/or calcium carbonate, may be used.

It is contemplated that the cross-linked particles ultimately formed from the method may share one or more properties with the particles that are formed earlier in the method via the step of combining the first, second, and third reactants in the presence of the hydrosilylation catalyst and the polar liquid to form an emulsion wherein the first, second, and third reactants react via hydrosilylation to form particles that have the condensable reactive group disposed thereon and that are disposed in the polar liquid.

The cross-linked particles may be used in an emulsion, slurry, or dispersion and/or may be dried and used as a powder. Alternatively, the polar liquid of the emulsion, slurry, or dispersion may be removed such that the liquid particles form an oil.

The cross-linked particles, emulsion, slurry, and/or dispersion may be utilized in any product such as personal care products (e.g. shampoos, deodorants, oral care compositions, and the like), in anti-bacterial products, in anti-acne products, in coatings, in cosmetics, in paints, in textiles, and the like.

Dispersion/Emulsion:

This disclosure also provides a dispersion (alternatively described as an emulsion, as set forth above) that includes a polar continuous phase and the aforementioned cross-linked particles disposed in the polar continuous phase. As described above, if the cross-linked particles are solid, the dispersion includes the solid cross-linked particles dispersed in the (liquid) polar continuous phase. If the cross-linked particles are liquid, the dispersion is typically further defined as an emulsion wherein the liquid cross-linked particles are dispersed in the (liquid) polar continuous phase. The dispersion may be alternatively described as a slurry. The dispersion or emulsion, as described herein or as described above, may include a surfactant or one or more surfactants, as described above.

In still other embodiments, this disclosure describes a step-growth emulsion polymerization process that utilizes reactive components (i.e., the first and second linear reactants) that form a high molecular weight siloxane polymer and also a reactive end-capping component (i.e., the third reactant) that allows for crosslinking using a separate chemical condensation reaction. In other words, in various embodiments, an emulsion polymer having condensation-reactive groups on silicon chain ends can be formed in the presence of a specialized chain terminator (i.e., the third reactants) wherein the chain terminator has condensable leaving groups such as alkoxy on silicon. Using this process, relatively low molecular weight siloxanes having Si—H terminal groups and Si-vinyl terminal groups can be combined with a small amount of a chain terminator having silicon alkoxy functionality in addition to either Si—H functionality or Si-vinyl functionality such that the reaction product can then be emulsified in water in the presence of a surfactant. A Pt catalyst can then be added to the emulsion such that an addition reaction occurs between the Si—H and Si-vinyl to grow a high molecular weight polymer within each emulsion particle. Concurrently with the Pt-catalyzed hydrosilylation step growth polymerization, the chain terminator can also participate in the reaction to cap the growing chains with a group having alkoxy functionality on Si. The concentration of the chain terminating group can determine the ultimate molecular weight of the polymer and since it varies inversely with molecular weight, relatively small amounts of the chain terminator can be used. When the Pt-catalyzed step growth polymerization is complete, a condensation catalyst can optionally be added, which will drive condensation reactions of the alkoxy functional polymers to form a crosslinked network. Thus emulsions of high molecular weight siloxane polymers having alkoxy functionality can be prepared by the method of this disclosure and such polymers can be crosslinked to form elastomers.

Film:

This disclosure also provides a film formed from the particle described above. The film is not particularly limited any may have any dimensions of length, width, and thickness. The film may include, consist essentially of, or consist of, the aforementioned particles. In one embodiment, the terminology "consist essentially of" describes that the film is free of polymers other than the polymers of the particles themselves. In various embodiments, the film has a thickness of from 10 to 100 nm, from 0.1 to 1,000 micrometers, or from 1,000 to 5,000, micrometers. In additional embodiments, any value, or range of values, both whole and fractional, within or between any one or more values described above are contemplated.

The film may be formed by any method of the art. In one embodiment, the method includes the step of separating the cross-linked particles from the polar liquid. This may be alternatively described as removing the polar liquid or drying the particles. This step may be as described above. The method may then include the step of forming the film using the particles. In various embodiments, the film is formed using extrusion or evaporation of water at ambient conditions or with heat.

The method of this disclosure typically allows for production of high molecular weight polymers. Before cross-linking, the molecular weight is typically dependent on ratios of the first, second, and third reactants, while the concentration of the third reactant (as chain stopped) tends to control molecular weight in an inverse ratio. The polymers of this disclosure tend to be tougher/stronger than similar polymers of lower molecular weight. These polymers tend to be able to form films more efficiently and robustly and tend to have a lower sheer modulus than their lower molecular weight analogs. Moreover, these polymers tend to be soft thereby allowing elastomers to be formed. In addition, these polymers tend to have a low cross-link density and high solvent swellability. The dispersions/emulsions of this disclosure allow for easier and more effective handling of high molecular weight polymers and allow films to be made much more easily and with decreased time and costs.

EXAMPLES

Example 1

50 g of polydimethylsiloxane having dimethylvinylsiloxy end groups, a vinyl content of approximately 0.09 percent and a viscosity of approximately 55,000 centipoise was weighed into a Max 100 cup followed by 0.708 g of polydimethylsiloxane having dimethylhydrogen end groups, a hydrogen content of 1.66 percent as Si—H and a viscosity of approximately 30 centipoise and 0.152 g of a chain terminating siloxane having the following structure: $HMe_2SiOSiMe_2(CH_2)_2Si(OMe)_3$. The cup was spun for 30 seconds at maximum speed (3400 RPM) using a SpeedMixer® laboratory mixer. 0.034 g of Syloff® 4000 (Pt catalyst) was added next and the cup was spun for 20 seconds at maximum speed. 1.10 g of C12EO4 (Brij® 30) was added followed by 1.10 g of 72% (aqueous) C12EO23 (Brij®35L) and 1.2 g of water (water #1). The cup was spun at maximum speed for 30 seconds. The mixture in the cup had a very viscous, gel-like consistency and it had a conical shape and it was transparent. The walls of the cup were scraped with a spatula and the mixture was spread around in the cup so as to disperse it. The cup was spun again for 30 seconds and it had again formed a conical shape and it was gel-like and also transparent. The contents of the cup was diluted with increments of water, starting with 1 g, then 2 g, then 3 g then 4 g, then 5 g, then 7 g, then 8 g, for a total of 30 g of water #2, the cup being spun at maximum speed for 20 seconds after each water addition. The emulsion, which was white and totally opaque in appearance, was allowed to remain undisturbed at ambient laboratory conditions for approximately 18 hours. The emulsion consisted of an approximately 60 percent active nonionic emulsion of high molecular weight polydimethyl siloxane having silicon-alkoxy functionality. Particle size of the emulsion was determined using a Malvern Mastersizer® 2000 and found to be 1.22 μm ($50^{th}$ percentile) and 1.74 μm ($90^{th}$ percentile). A polymeric film was cast by pipetting approximately 7 g of the emulsion into a 150 mm plastic Petri dish and allowing the emulsion to dry for 24 hours. Examination of the film revealed it to be much higher viscosity that the starting 55,000 centipoise polymer. The polymer was not elastomeric and it was soluble in heptane.

20 g of the emulsion was weighed into a Max 40 cup followed by a 50 percent active, aqueous emulsion of dioctyltindilaurate. The cup was spun for 20 seconds at maximum speed using a SpeedMixer® laboratory mixer. A 10 g aliquot of emulsion was pipetted into a plastic Petri dish and allowed to dry at ambient laboratory conditions for approximately 20 hours. The resulting film was elastomeric and tack free. A second 10 g aliquot was pipette into a Petri dish and allowed to dry for approximately 3 days. The resulting elastomeric film was weighed and transferred to a 60 ml jar. The jar was filled with heptanes and the jar was capped and allowed to remain undisturbed for approximately 48 hours. The elastomeric film in the jar had swollen significantly. The jar was opened and its contents were emptied into a pre-weighed 100 mm diameter wire mesh (30×30 mesh) screen. The screen was shaken several times over a minute to dislodge excess heptanes and the screen with elastomer swollen with heptane was weighed. The screen was placed in a laboratory hood and the heptane was allowed to dry for 16 hours at ambient laboratory conditions. The screen was placed into a 70° C. oven for 4 hours after which it was allowed to cool and it was reweighed. From these weights, the volume percent swell in heptane and the percent gel were determined.

Volume percent swell (in C7H16): 6,200%
Percent gel: 79.3 percent

Example 2

10 g of the emulsion described in Example 1 was weighed into a Max 20 cup followed by 0.032 g of DBU (1,8-Diazabicycloundec-7-ene). The cup was spun for 20 seconds at maximum speed using a SpeedMixer® laboratory mixer. 10 g of emulsion was pipetted into a plastic Petri dish and allowed to dry for 20 hours. The resulting film was elastomeric and insoluble in heptane.

The aforementioned examples demonstrate how particles of very high molecular weight polymers are formed and the polymers within the particles are further crosslinked to form elastomeric networks. Polymers of moderate molecular weight and having reactive functional groups are formed into particles and allowed to react via hydrosilylation to form particles of very high molecular weight polymers. The polymers of each particle are further reacted via a condensation reaction that forms crosslinked polymers, leading to an elastomer. Thus particles of elastomers derived from very high molecular weight polymers can be prepared by this method. Using other means, it is difficult to prepare particles starting with very high molecular weight polymers because of the high viscosity associated with such very high molecular weight polymers.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

What is claimed is:

1. A method of preparing condensation cross-linked particles in an emulsion, said method comprising the steps of:
   A. providing a first linear reactant having two unsaturated carbon-carbon moieties;
   B. providing a second linear reactant having two Si—H moieties;
   C. providing a third reactant having at least one condensable reactive group and having up to two unsaturated carbon-carbon moieties or Si—H moieties with the proviso that the third reactant has at least one unsaturated carbon-carbon moiety or Si—H moiety;
   D. providing a hydrosilylation catalyst;
   E. providing a polar liquid;
   F. combining the first, second, and third reactants in the presence of the hydrosilylation catalyst and the polar liquid to form an emulsion wherein the first, second, and third reactants react via a hydrosilylation reaction to form particles in the emulsion that have a linear backbone wherein the condensable reactive group is disposed thereon, and wherein the particles are disposed in the polar liquid; and
   G. cross-linking the linear backbone via a condensation reaction to form the condensation cross-linked particles.

2. The method of claim 1 wherein the step of cross-linking is further defined as adding a condensation catalyst to the first, second, and/or third reactants and/or the particles to cross-link the linear backbone of the particles via a condensation reaction of the condensable groups.

3. The method of claim 1 wherein the third reactant is an alkoxysilane having the Si—H moiety.

4. The method of claim 1 wherein the step of combining the first, second, and third reactants further comprises phase inverting the combination of the first, second, and third reactants to form the emulsion.

5. The method of claim 1 wherein the third reactant has the formula:

$$XR'SiR''_t(OR)_{4-t}$$

wherein each of R, R', R" is independently an organic radical having 1-12 carbon atoms, X is independently the unsaturated carbon-carbon moiety or the Si—H moiety, and t is 0-2.

6. The method of claim 1 wherein the third reactant is $HSi(CH_3)_2OSi(CH_3)_2CH_2CH_2Si(OCH_3)_3$ or $H_2C\!=\!CHSi(OCH_3)_3$.

7. The method of claim 1 wherein the condensable reactive group is an —Si(OR) group wherein R is an organic radical having 1-12 carbon atoms.

8. The method of claim 1 wherein the first linear reactant is free of silicon such that the linear backbone is further defined as a linear organic backbone.

9. The method of claim 1 wherein the first linear reactant is further defined as a siloxane such that the linear backbone is further defined as a linear silicone backbone.

10. The method of claim 1 wherein the first linear reactant is a polydimethylsiloxane having two terminal unsaturated carbon-carbon moieties, the second linear reactant is a polydimethylsiloxane having two terminal Si—H moieties, and the third reactant is $HSi(CH_3)_2OSi(CH_3)_2CH_2CH_2Si(OCH_3)_3$ or $H_2C\!=\!CHSi(OCH_3)_3$.

11. A cross-linked particle formed from the method of claim 1.

12. A dispersion comprising:
   a polar continuous phase; and
   cross-linked particles as set forth in claim 1.

13. A film comprising the cross-linked particles of claim 1.

14. A method of forming the film of claim 13 comprising the steps of:
   separating the polar liquid from the cross-linked particles; and
   forming the film from the cross-linked particles.

15. An emulsion comprising cross-linked particles and a polar liquid formed from the method of claim 1.

16. A method comprising separating from the emulsion of claim 15 the cross-linked particles from the polar liquid.

17. Cross-linked particles formed in accordance with the method of claim 16.

* * * * *